United States Patent Office.

ELIZA D. MURFEY, OF NEW YORK, N. Y., ASSIGNOR TO THE MANHATTAN PACKING MANUFACTURING COMPANY, OF SAME PLACE.

Letters Patent No. 108,722, dated October 25, 1870.

IMPROVEMENT IN MATERIALS FOR JOURNALS AND BEARINGS.

The Schedule referred to in these Letters Patent and making part of the same

I, ELIZA DEXTER MURFEY, of New York, county of New York, State of New York, have invented an Improved Bearing for Journals, &c., of which the following is a specification.

Nature and Object of the Invention.

My invention consists of an improved bearing for journals, &c., too fully described hereafter to need preliminary explanation.

General Description.

Upon a sheet of rubber fabric, (that is, cloth, leather, paper, Shaker flannel, or any suitable material, coated with rubber,) is spread a bearing material or composition, which may consist of any suitable ingredients. I prefer, however, to use paraffine, combined with powdered plumbago, burnt hair, and ivory-dust.

The sheet thus coated is passed between heated rolls, which soften the rubber, so that the paraffine partially dissolves the same, and at the same time work the powdered bearing material into the plastic rubber, and expel the excess of paraffine.

To cause a thorough combination of the bearing material with the sheet to which it is applied, the said sheet may be perforated throughout its entire extent with fine needles or punches, so that, on the application of pressure, the material will be forced into the perforations.

After the sheet is prepared it may be cut into strips, pads, or washers, for use as substitutes for the ordinary metallic bearings.

The continued integrity of the bearing under the heaviest pressure is insured by the fabric or sheet upon which the materials forming the bearing surface are cemented by the rubber, while the latter, without yielding sufficiently to materially deflect the shaft or axle, will absorb the jars, which would otherwise be communicated to the frame of the machine or to the vehicle.

A sheet of any suitable material may be impregnated with bearing material by perforating the sheet as described; and, in some instances, a sheet having rubber only on the bearing face may be used, or the back of the sheet may be coated with rubber, a bearing composition being applied to the bearing face.

Claims.

1. A bearing for journals, &c., consisting of a sheet of fabric, or other material, to which rubber and a bearing material are applied, substantially as set forth.

2. A rubber-coated sheet, the bearing face of which consists of a bearing material worked into the face of the rubber, as described.

3. The combination of a bearing material with a perforated sheet, as set forth.

In testimony whereof, I have signed my name to this specification in the presence of two subscribing witnesses.

ELIZA D. MURFEY.

Witnesses:
THOMAS PRUDEN,
HENRY McMANUS.